(12) United States Patent
Zhang et al.

(10) Patent No.: US 7,760,469 B2
(45) Date of Patent: *Jul. 20, 2010

(54) METHOD AND APPARATUS FOR AN AIR BEARING SURFACE TO REDUCE CONTAMINATION DUE TO SATURATION WATER VAPOR PRESSURE IN A HARD DISK DRIVE

(75) Inventors: Shuyu Zhang, Fremont, CA (US);
Brian D. Strom, Cupertino, CA (US);
SungChang Lee, San Jose, CA (US);
George Tyndall, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 465 days.

This patent is subject to a terminal disclaimer.

(21) Appl. No.: 11/586,778

(22) Filed: Oct. 25, 2006

(65) Prior Publication Data
US 2007/0297092 A1 Dec. 27, 2007

Related U.S. Application Data (60) Provisional application No. 60/816,162, filed on Jun. 23, 2006.

(51) Int. Cl.
*G11B 5/60* (2006.01)
(52) U.S. Cl. .................. 360/235.6; 360/236.4
(58) Field of Classification Search ... 360/235.4–235.7, 360/236, 236.3–236.5, 237
See application file for complete search history.

(56) References Cited

U.S. PATENT DOCUMENTS 5,021,906 A * 6/1991 Chang et al. ............. 360/235.1
6,236,543 B1 * 5/2001 Han et al. ................ 360/236.6
6,459,547 B1 * 10/2002 Riddering et al. ........ 360/236.6
6,490,135 B1 * 12/2002 Sannino et al. .......... 360/235.8
6,504,682 B1 * 1/2003 Sannino et al. .......... 360/235.8

(Continued)

FOREIGN PATENT DOCUMENTS

JP 61080574 A * 4/1986

(Continued)

OTHER PUBLICATIONS

"Effects of Humid Air on Air Bearing Flying Height" by Strom et al., manuscript submitted Apr. 2, 2006 for unknown conference session. Publication status unknown.

(Continued)

*Primary Examiner*—William J Klimowicz
(74) *Attorney, Agent, or Firm*—GSS Law Group (57) ABSTRACT

A slider operating air bearing surface (ABS) to remove a front saturation water vapor pressure peak near a front bulwark and a bad flow pattern area the between front bulwark and a central island. The ABS implementing these operations. Alternatively, ABS includes a front bulwark channel in the front bulwark and a central fin between the front bulwark and the central island. Slider includes an embodiment of the ABS. Head gimbal assembly (HGA) includes the slider. Head stack assembly includes at least one HGA. Hard disk drive includes the head stack assembly. Manufacturing methods for the slider, the HGA, the head stack assembly, the hard disk drive, and these items as products of their manufacturing processes.

41 Claims, 10 Drawing Sheets

U.S. PATENT DOCUMENTS

| | | | |
|---|---|---|---|
| 6,525,909 B1 * | 2/2003 | Qian et al. | 360/235.7 |
| 6,538,849 B1 * | 3/2003 | Fayeulle et al. | 360/236.3 |
| 6,600,635 B2 * | 7/2003 | Smith | 360/294.7 |
| 6,647,612 B1 * | 11/2003 | Boutaghou et al. | 29/603.12 |
| 6,700,727 B1 * | 3/2004 | Crane et al. | 360/75 |
| 6,934,122 B2 * | 8/2005 | Boutaghou et al. | 360/235.5 |
| 7,209,323 B2 * | 4/2007 | Boutaghou et al. | 360/235.5 |
| 7,227,723 B2 * | 6/2007 | Nath et al. | 360/235.7 |
| 7,408,741 B2 * | 8/2008 | Agari et al. | 360/235.8 |
| 7,420,760 B2 * | 9/2008 | Zhang et al. | 360/75 |
| 2002/0030938 A1 * | 3/2002 | Boutaghou et al. | 360/236.3 |
| 2002/0067575 A1 * | 6/2002 | Brand et al. | 360/235.6 |
| 2002/0135941 A1 * | 9/2002 | Kohira et al. | 360/235.5 |
| 2002/0191340 A1 * | 12/2002 | Chapin et al. | 360/235.8 |
| 2003/0058578 A1 * | 3/2003 | Boutaghou et al. | 360/235.8 |
| 2005/0105216 A1 * | 5/2005 | Ueno et al. | 360/236.3 |
| 2005/0190501 A1 * | 9/2005 | Boutaghou et al. | 360/236.2 |
| 2005/0225902 A1 * | 10/2005 | Kohira | 360/235.8 |
| 2006/0023354 A1 * | 2/2006 | Stipe | 360/128 |
| 2006/0023358 A1 * | 2/2006 | Huang | 360/235.6 |
| 2006/0139810 A1 * | 6/2006 | Hashimoto et al. | 360/235.8 |
| 2007/0025022 A1 * | 2/2007 | Agari et al. | 360/235.8 |
| 2007/0025023 A1 * | 2/2007 | Kohira et al. | 360/236.2 |
| 2007/0230050 A1 * | 10/2007 | Ruiz | 360/128 |

FOREIGN PATENT DOCUMENTS

| | | | |
|---|---|---|---|
| JP | 02139776 A | * | 5/1990 |
| JP | 02162584 A | * | 6/1990 |
| JP | 03252975 A | * | 11/1991 |
| JP | 10302238 A | * | 11/1998 |
| JP | 2006092709 A | * | 4/2006 |

OTHER PUBLICATIONS

Product data sheet "SHT1x/SHT7x Humidity and Temperature Sensor", v. 2.04 May 2005, Sensirion AG, Laubisrutistr. 50, CH-8712 ZH, Switzerland.

* cited by examiner

METHOD AND APPARATUS FOR AN AIR BEARING SURFACE TO REDUCE CONTAMINATION DUE TO SATURATION WATER VAPOR PRESSURE IN A HARD DISK DRIVE

CROSS REFERENCE TO RELATED APPLICATIONS

This patent application claims priority to U.S. Provisional Patent Application No. 60/816,162 filed Jun. 23, 2006, which is incorporated herein by reference.

TECHNICAL FIELD

The invention relates to air bearing surfaces in sliders of hard disk drives, in particular to air bearing surfaces removing saturation water vapor peaks upwind of the front bulwark and removing bad flow pattern areas that may readily cause contamination between the front bulwark and the central island.

BACKGROUND OF THE INVENTION

Contemporary hard disk drives employ a voice coil motor pivoting about an actuator pivot to position one or more sliders over rotating disk surfaces. Each slider is supported a very short distance above its rotating disk surface by an air bearing formed by the flow of air through the gap between the air bearing surface of the slider and the disk surface. The slider is positioned at a pitch angle to disk surface, with the trailing edge being closest to it and the front edge furthest. Near the trailing edge, the read-write head operate to access the data typically stored in a track of the disk surface. It is well known that the air bearing surfaces tend to accumulate contaminants during the life cycle of a hard disk drive. As these contaminants accumulate, there is a growing probability of performance degradation of the read-write head in accessing the data.

What is needed is a better understanding of the causes of contamination and methods and/or mechanisms that limit or control these causes, thereby improving the reliability of the hard disk drive as a whole.

SUMMARY OF THE INVENTION

Embodiments of the invention solve a previous unrecognized problem regarding the effect of saturation water vapor pressure on the accumulation of contaminants on an air bearing surface in a hard disk drive. A slider is operating an air bearing surface within a flying height of a rotating disk surface in the hard disk drive. The air bearing surface removes a front saturation water vapor pressure peak from forming near a front bulwark of the air bearing surface and also removes a bad flow pattern area between the front bulwark and a central island near a trailing edge of the slider. These two operations effectively minimize the accumulation of contaminants near the center of the air bearing surface due to water vapor contamination.

The slider operates with a compression ratio between a front height and the flying height. The front height is a distance between the front edge and the rotating disk surface. The flying height is the distance between the trailing edge and the rotating disk surface. The compression ratio is defined herein as the ratio of air pressure before the front edge to the air pressure at the trailing edge, and is at least eight. The compression ratio may further preferably be at least ten.

The air bearing surface supports these operations by including the following: A first means for removing the front saturation water vapor pressure peak near the front bulwark and a second means for removing the bad flow pattern area between the front bulwark and the central island.

The first means for removing may include a front bulwark channel dividing the front bulwark into a first front bulwark and a second front bulwark. The front bulwark channel may preferably be of steady depth between the first front bulwark and the second front bulwark.

The second means for removing may include a central fin between the front bulwark and the central island. The central fin may be connected to the central island.

Alternatively, the air bearing surface includes a front bulwark channel dividing a front bulwark into a first front bulwark and a second front bulwark to remove a front saturation vapor pressure peak near the font bulwark, when the air bearing surface is within a flying height of a rotating disk surface and a central fin between the front bulwark and the central island to remove a bad flow pattern area between the front bulwark and a central island near a trailing edge of the slider, when the air bearing surface is within the flying height of the rotating disk surface. The front bulwark is located near a front edge of the slider and the central island is located near the read-write head. The flying height is at most twenty nanometers, and preferably at most ten nanometers.

The slider may include the air bearing surface, which provides the central island near the read-write head. The slider may further include an intake heater situated near the front edge to heat air and alter a saturation water pressure between the air bearing surface and the rotating disk surface.

The slider may further include a vertical micro-actuator for altering the flying height through electrical stimulus and using a member of the micro-actuator effect group consisting of: a thermo-mechanical effect, a piezoelectric effect, and an electrostatic effect, and/or an amplifier interacting with the read-write head to create a read signal.

Manufacturing the slider may include forming the air bearing surface with the central island near the trailing edge to create the slider. The slider is a product of this process.

A head gimbal assembly including the slider may further support these operations. The head gimbal assembly may further include a pitch actuator mechanically coupled through a flexure finger to the slider for altering a pitch angle between the slider and the rotating disk surface. The head gimbal assembly may further include a micro-actuator assembly mechanically coupled to the slider to alter at least a lateral position over a track on the rotating disk surface; wherein the micro-actuator assembly uses at least one member of the micro-actuator effect group.

Manufacturing the head gimbal assembly may include coupling the slider to a flexure finger to create the head gimbal assembly. The head gimbal assembly is a product of this process.

A head stack assembly including at least one of the head gimbal assemblies may further support these operations. Manufacturing the head stack assembly may include coupling at least one of the head gimbal assemblies to a head stack to create the head stack assembly. The head stack assembly is a product of this process.

The hard disk drive supporting these operations preferably includes the head stack assembly. The sliders may be parked next to an inside diameter of their disk surface in a Contact Start-Stop (CSS) hard disk drive, preferably with their air bearing surfaces including pads with diamond like Carbon. Alternatively, the slider may be parked on a ramp near the outside diameter of the disk surface, in which case, the air bearing surfaces often will not include pads with diamond like Carbon.

Manufacturing the hard disk drive may include rotatably coupling the head stack assembly by an actuator pivot to a disk base to create the hard disk drive. The hard disk drive is a product of this process.

BRIEF DESCRIPTION OF THE DRAWINGS

FIGS. 1D to 3A and 4A show an air bearing surface in accord with at least one embodiment of the invention;

DETAILED DESCRIPTION

This invention relates to air bearing surfaces in sliders of hard disk drives, in particular to air bearing surfaces removing saturation water vapor peaks upwind of the front bulwark and removing bad flow pattern areas that may readily cause contamination between the front bulwark and the central island.

Embodiments of the invention solve a previous unrecognized problem regarding the effect of saturation water vapor pressure on the accumulation of contaminants on an air bearing surface 92 in a hard disk drive 10. A slider 90 operates an air bearing surface 92 within a flying height FH of a rotating disk surface 120 in the hard disk drive. The air bearing surface removes a front saturation water vapor pressure peak SVP from forming near a front bulwark FB of the air bearing surface and also removes a bad flow pattern area BFPA between the front bulwark and a central island CI near a trailing edge TE of the slider. These two operations effectively minimize the accumulation of contaminants near the center of the air bearing surface due to water vapor contamination.

IN greater detail, saturation water vapor pressure plays an important part in the accumulation of debris, oil, particles and the like, which contaminates an air bearing surface 92 of a slider 90 as will be discussed regarding FIGS. 1A to 1C and 8B. These Figures show a typical air bearing surface, which includes a front edge FE situated away from the trailing edge TE, which will travel at a flying height FH above the rotating disk surface 120 of the disk 12. A read-write head 94 is situated near the trailing edge. Near the front edge a front bulwark FB is frequently found. And upwind of the read-write head, a central island CI is often used to protect the read-write head from collisions with particles, lubricants and contact with the disk surface.

Figure 1A:
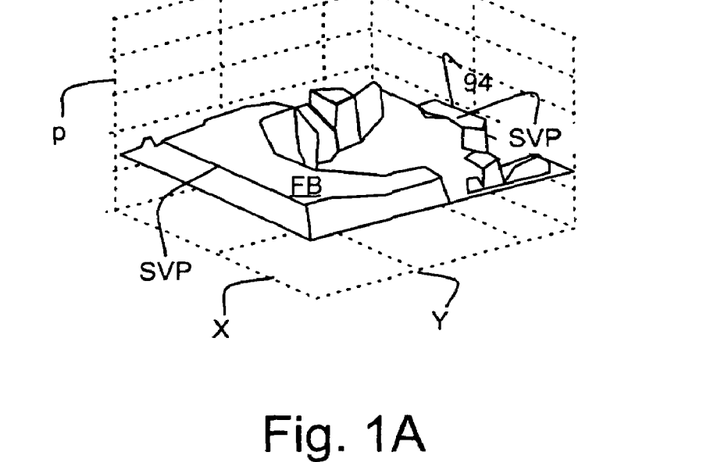
FIGS. 1A to 1C show the effects of saturation water vapor pressure and the accumulation of contaminants on an air bearing surface.
Figure 1B:
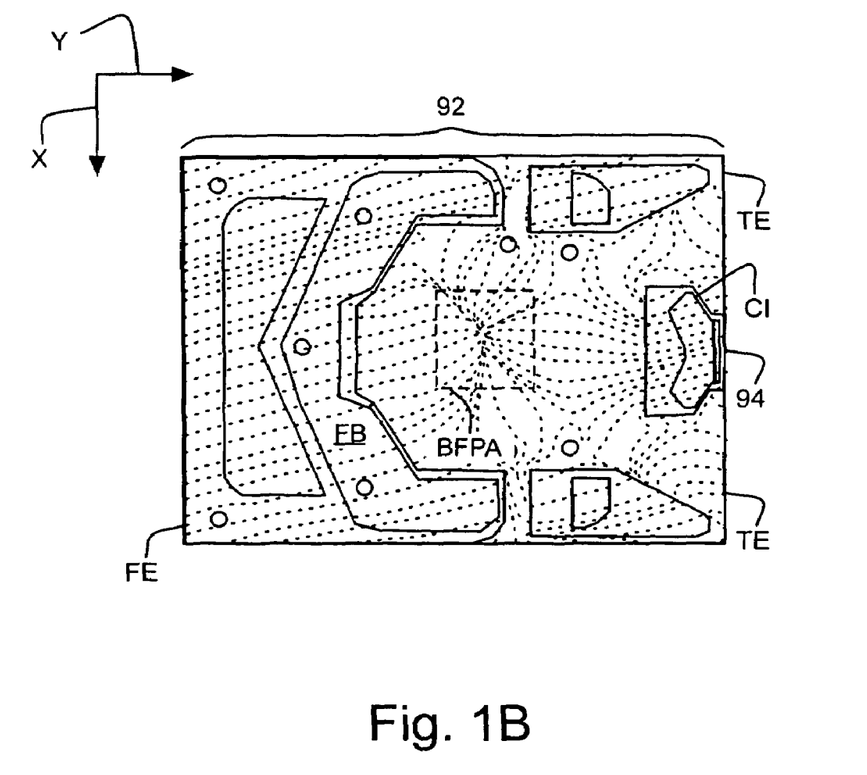
Figure 1C:
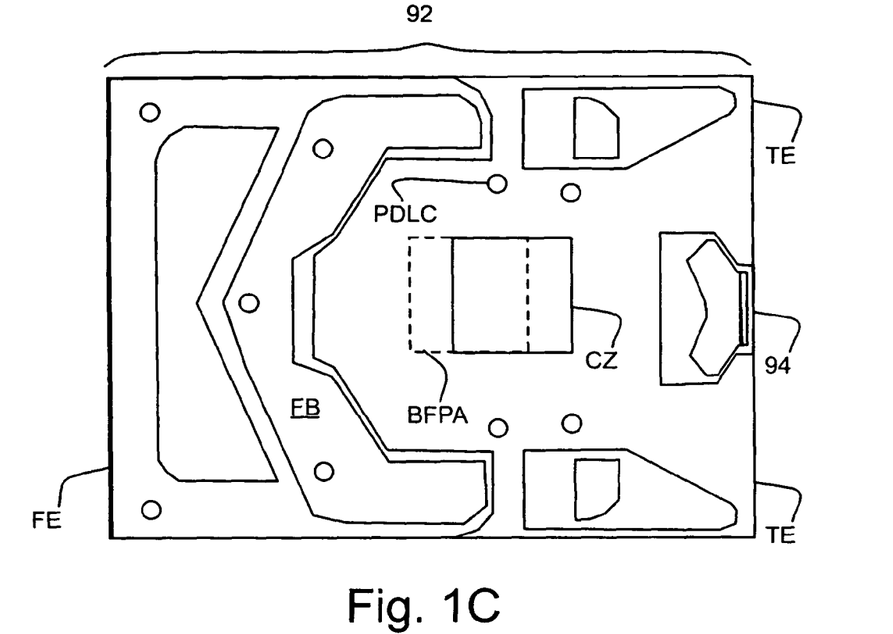

FIG. 1A shows the water vapor pressure distribution for the air bearing surface 92 shown in FIGS. 1B and 1C, with a saturation water vapor pressure peak SVP near the front bulwark FB, and a second saturation water vapor pressure peak SVP located near the central island CI and the read-write head 94. FIG. 1B shows an air flow map of the air bearing surface with a bad flow pattern area BFPA forming between the front bulwark and the central island. The bad flow pattern area is somewhat akin to the eye of a hurricane, things traveling in the air which get there have a higher tendency to settle near there. Visual inspection of the air bearing surface showed a contaminant zone CZ just downwind from the bad flow pattern area as shown in FIG. 1C.

Figure 8A:
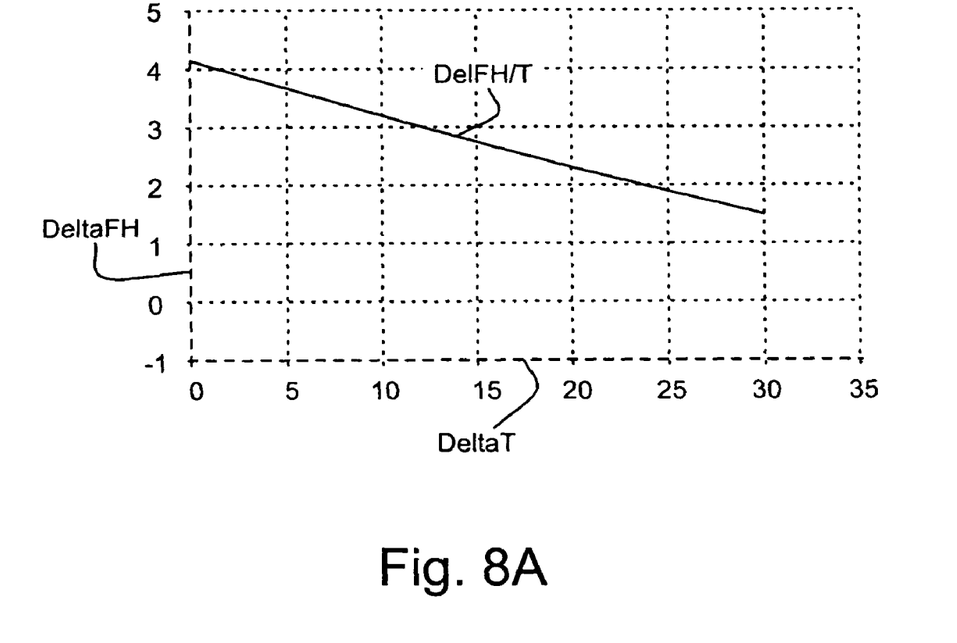
FIG. 8A shows the relationship between heating the air flowing between the slider and the rotating disk surface and the change in flying height that results.
Figure 8B:
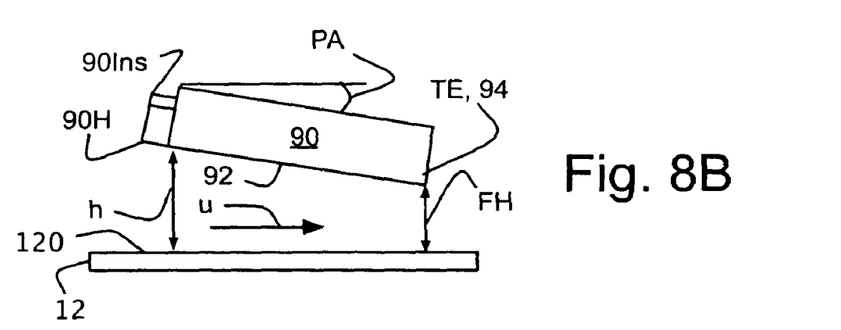
FIGS. 8B and 8C show some further aspects of a slider in accord with at least one embodiment of the invention.

The slider operates with a compression ratio between a front height h and the flying height FH as shown in FIG. 8B. The front height is a distance between the front edge FE and the rotating disk surface 120. The flying height refers herein to the distance between the trailing edge TE and the rotating disk surface. The compression ratio is defined herein as the ratio of air pressure p before the front edge to the air pressure at the trailing edge. The compression ratio is at least eight, often around ten, and may be higher.

An air bearing surface 92 supporting these operations may include the following: A first means for removing MFBS the front saturation water vapor pressure peak SVP near the front bulwark FB and a second means for removing MRLP the bad flow pattern area BFPA between the front bulwark and the central island CI.

Figure 1D:
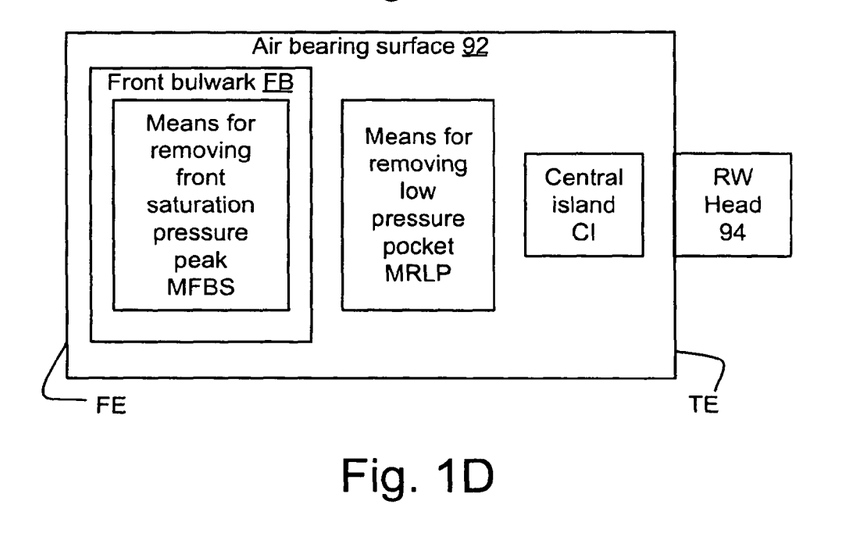

One air bearing surface 92 that solves these problems is shown in schematic fashion in FIG. 1D and in further detail in FIGS. 2A to 3A and 4A. It operates by removing the saturation water vapor pressure peak SVP near the front bulwark FB and removing the bad flow pattern area BFPA between the front bulwark and the central island CI.

Schematically speaking an air bearing surface 92 in accord with at least one embodiment of the invention may include the following as shown in FIG. 1D. The front bulwark FB includes first means for removing MFBS the front saturation water vapor pressure peak SVP near the front bulwark FB. The air bearing surface also includes a second means for removing MRLP the bad flow pattern area BFPA from between the front bulwark FB and the central island CI.

By way of example, FIGS. 2A to 3A and 4 show the air bearing surface 92 of FIG. 1D in greater detail. The first means for removing MFBS the front saturation water vapor pressure peak SVP near the front bulwark FB may preferably include a front bulwark channel FBC dividing the front bulwark FB into a first front bulwark FB1 and a second front bulwark FB2. The front bulwark channel may preferably be of steady depth between the first front bulwark and the second front bulwark.

The second means for removing MRLP the bad flow pattern area BFPA from between the front bulwark FB and the central island CI may preferably include a central fin CF. The central fin may preferably connect to the central island.

Alternatively, the air bearing surface 92 may preferably include a front bulwark channel FBC dividing a front bulwark FB into a first front bulwark FB1 and a second front bulwark FB2 to remove a front saturation vapor pressure peak SVP near the font bulwark, when the air bearing surface is within a flying height FH of a rotating disk surface D120 and a central fin CF between the front bulwark and the central island CI to remove a bad flow pattern area BFPA between the front bulwark and a central island near a trailing edge TE of the slider, when the air bearing surface is within the flying height of the rotating disk surface. The front bulwark is located near a front edge FE of the slider and the central island is located near the read-write head 94. The flying height is at most twenty nanometers, and preferably at most ten nanometers.

Figure 8C:
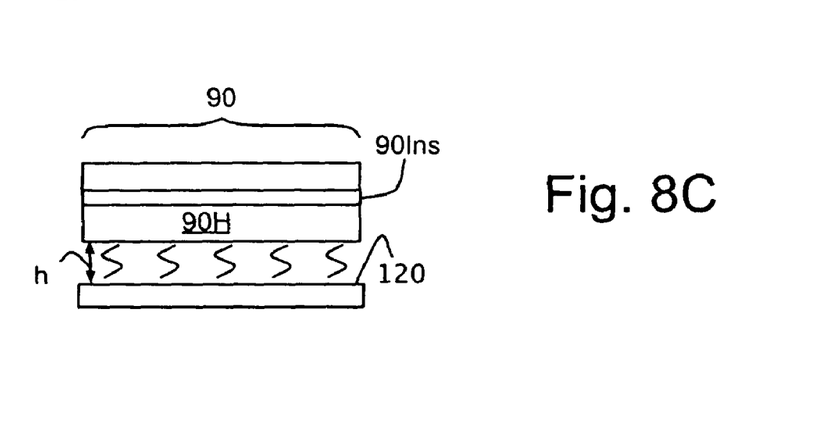

The slider 90 preferably includes the air bearing surface 92, which provides the central island CI near the read-write head 94. The slider may further include an intake heater 90H situated near the front edge FE to heat air as shown in FIGS. 8B and 8C. the intake heater alters the saturation water pressure between the air bearing surface 92 and the rotating disk surface 120 to reduce the change in flying height DeltaFH versus the change in air temperature DeltaT as shown in FIG. 8A. The relationship of the change in air temperature represented by the horizontal axis and the change in flying height shown as the vertical axis is summarized by the trace labeled DelFH/T. The units of the horizontal axis are in degrees Centigrade and the units of the vertical axis are in nanometers.

Figure 2A:
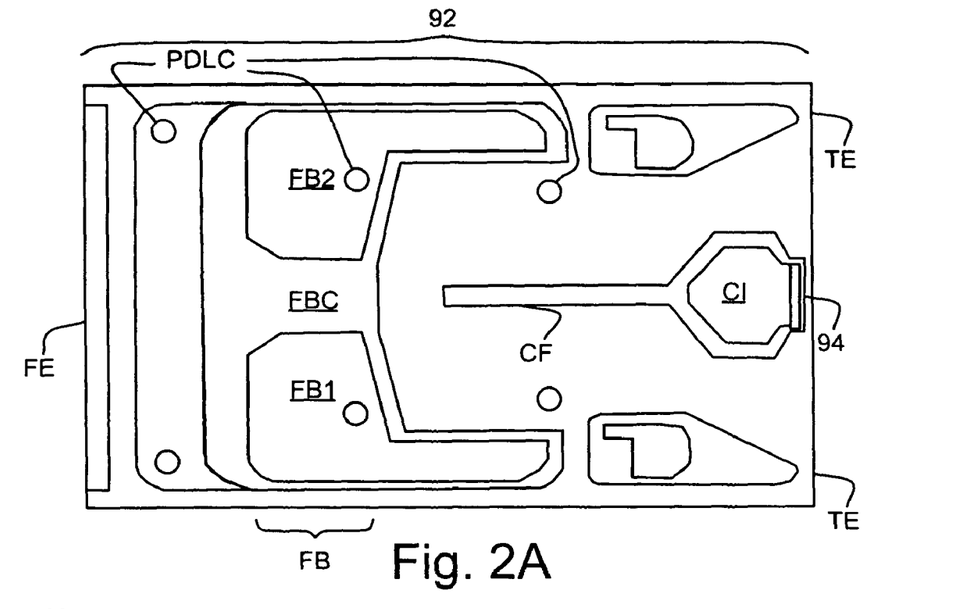
Figure 2B:
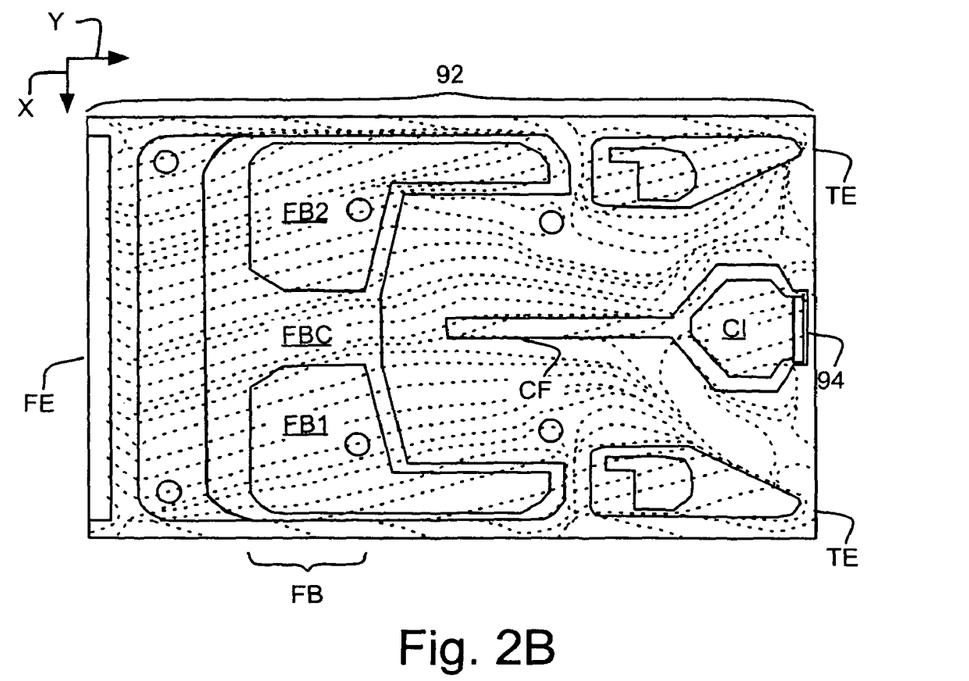
Figure 3A:
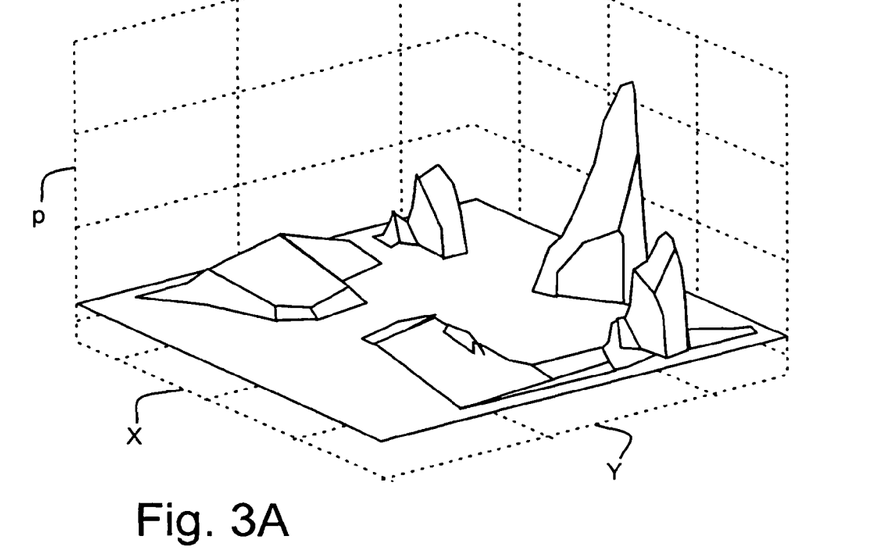
Figure 3B:
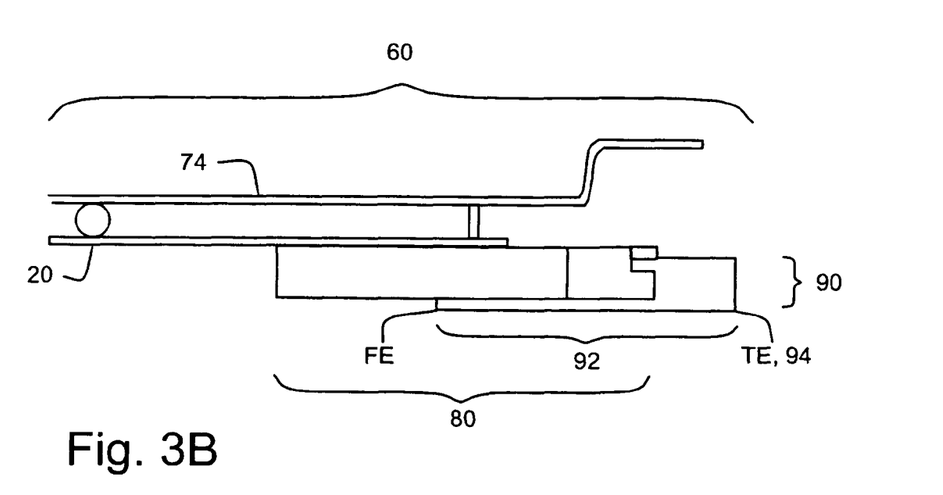
FIGS. 3B and 4B show aspects of a head gimbal assembly incorporating the air bearing surface.
Figure 4A:
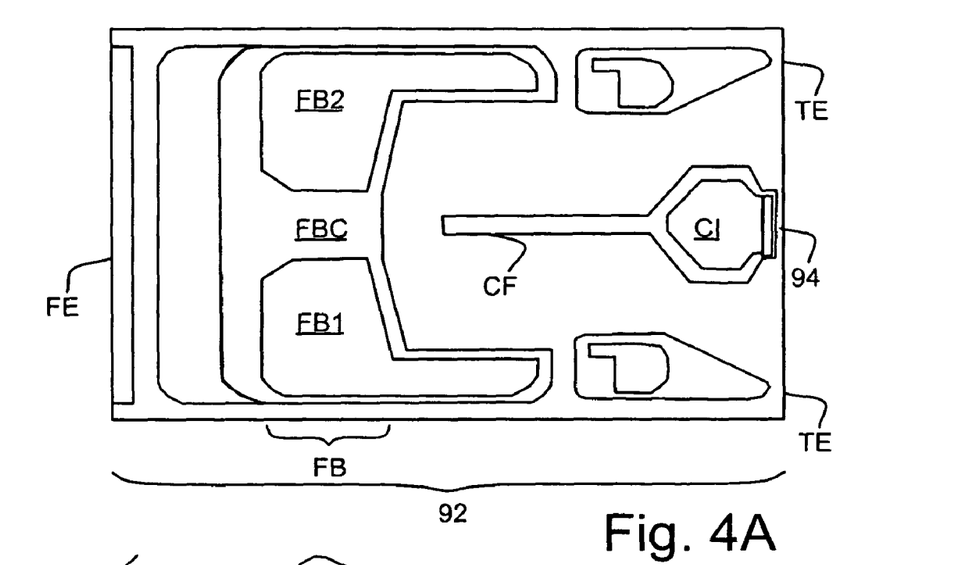

FIGS. 2B and 3B show the results of numerical simulations on this new air bearing surface 92 implementing the elements of at least one embodiment of the invention additionally shown in FIGS. 1D, 2A and 4A. The conditions used for these Figures and for FIGS. 1A and 1B are an air speed u of 24 meters per second corresponding to a middle diameter MD region of the rotating disk surface 120 for a disk 12 in a 3.5 inch hard disk drive 10. The actuator assembly 50, in particular the head gimbal assembly 60, was assumed to have 2.5 gf gram load with no pitch and no roll torque. The flying height FH in dry air was assumed to be 10 nanometers (nm). The ambient air environment was assumed to have a temperature of 65° Centigrade (C) at 75% relative humidity with a water saturation vapor pressure of 26.8 kPa.

Figure 6A:
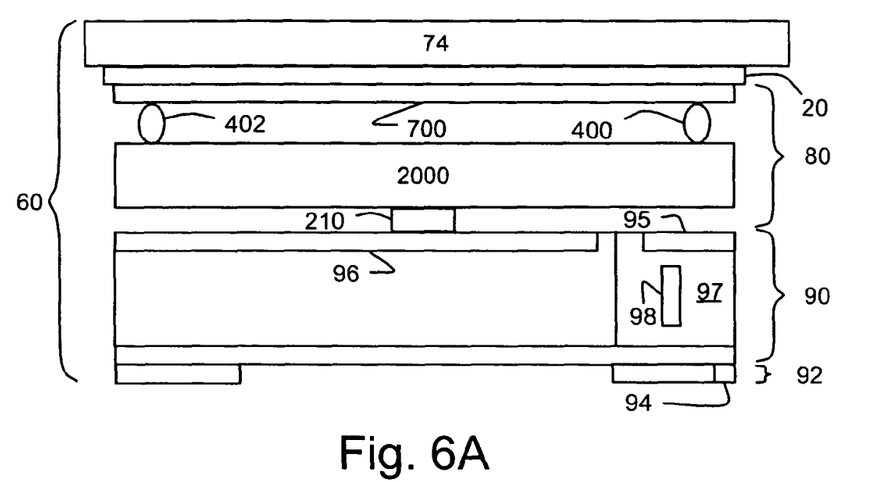
FIGS. 6A and 6B show an alternative micro-actuator assembly for use in the head gimbal assembly and some further elements which may be included in a slider using the air bearing surface.

The slider 90 may further include a vertical micro-actuator 98 for altering the flying height FH through electrical stimulus and using a member of the micro-actuator effect group consisting of: a thermo-mechanical effect, a piezoelectric effect, and an electrostatic effect, and/or an amplifier 96 interacting with the read-write head 94 to create a read signal as shown in FIG. 6A.

Manufacturing the slider 90 includes forming the air bearing surface 92 with the central island CI near the trailing edge TE to create the slider. The slider is a product of this process.

A head gimbal assembly 60 including the slider 90 as shown in FIGS. 3B, 4B, 6A and 9A to 9D may further support these operations. The head gimbal assembly may further include a pitch actuator PAA mechanically coupled through a flexure finger 20 to the slider 90 for altering a pitch angle PA between the slider and the rotating disk surface 120 as shown in FIG. 9A to 9D. Pitch actuators may be preferred in Contact Start-Stop (CSS) hard disk drives, which will be discussed in detail later.

Figure 5A:
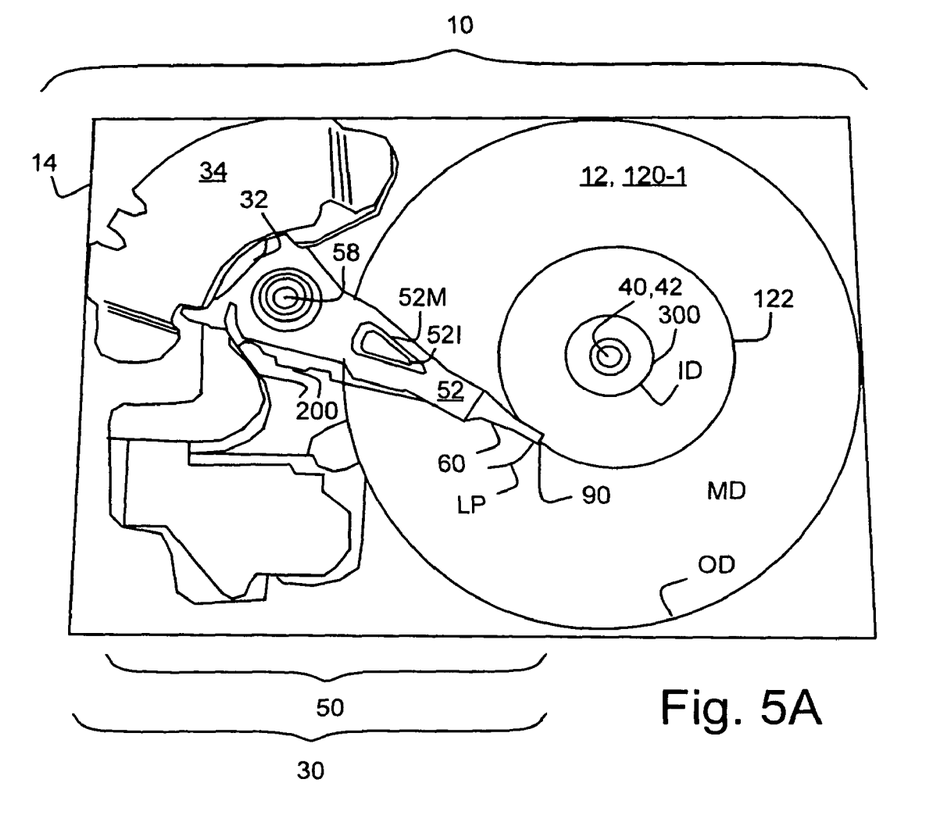
FIGS. 5A and 5B show some aspects of a hard disk drive incorporating the head gimbal assembly.
Figure 6B:
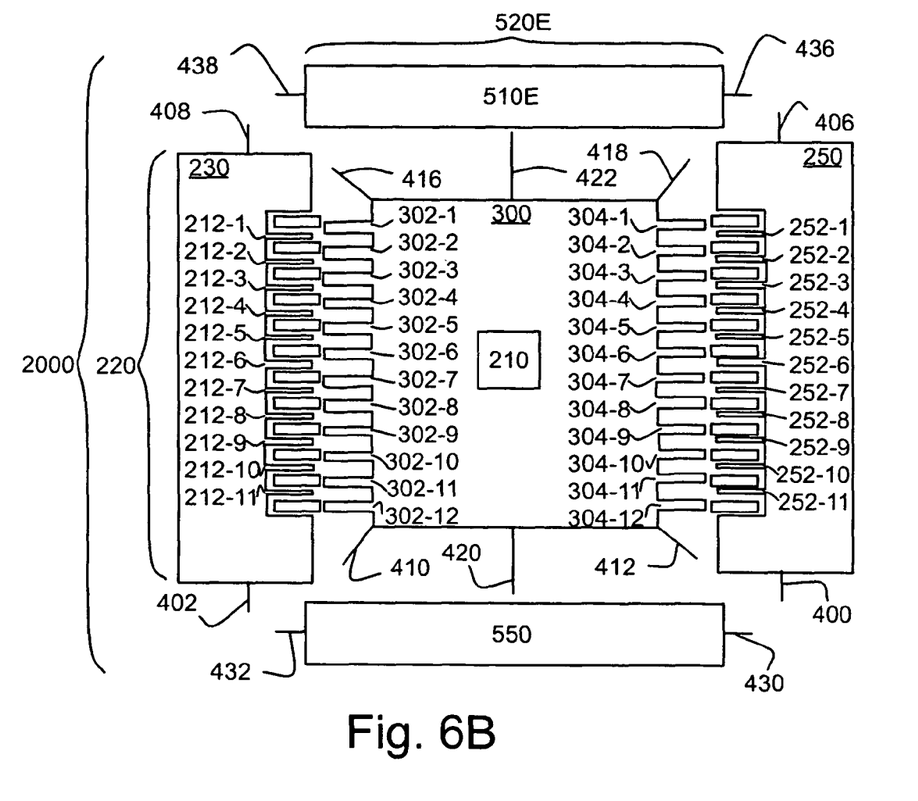

The head gimbal assembly 60 may further include a micro-actuator assembly 80 mechanically coupled to the slider to alter at least a lateral position LP over a track 122 on the rotating disk surface as shown in 5A, where the micro-actuator assembly preferably uses at least one member of the micro-actuator effect group. FIG. 3B shows a side view of the micro-actuator assembly employing the piezoelectric effect. FIGS. 6A and 6B show an example of a micro-actuator assembly employing the electrostatic effect.

In further detail, FIG. 3B shows a side view of the head gimbal assembly 60 with a micro-actuator assembly 80 for aiding in laterally positioning of the slider 90. In certain embodiments, the micro-actuator assembly may employ a piezoelectric effect and/or an electrostatic effect and/or a thermal mechanical effect. The head gimbal assembly may preferably include a base plate 72 coupled through a hinge 70 to the load beam 74. Often the flexure finger 20 is coupled to the load beam and the micro-actuator assembly 80 and slider 90 are coupled through the flexure finger to the head gimbal assembly.

Figure 4B:
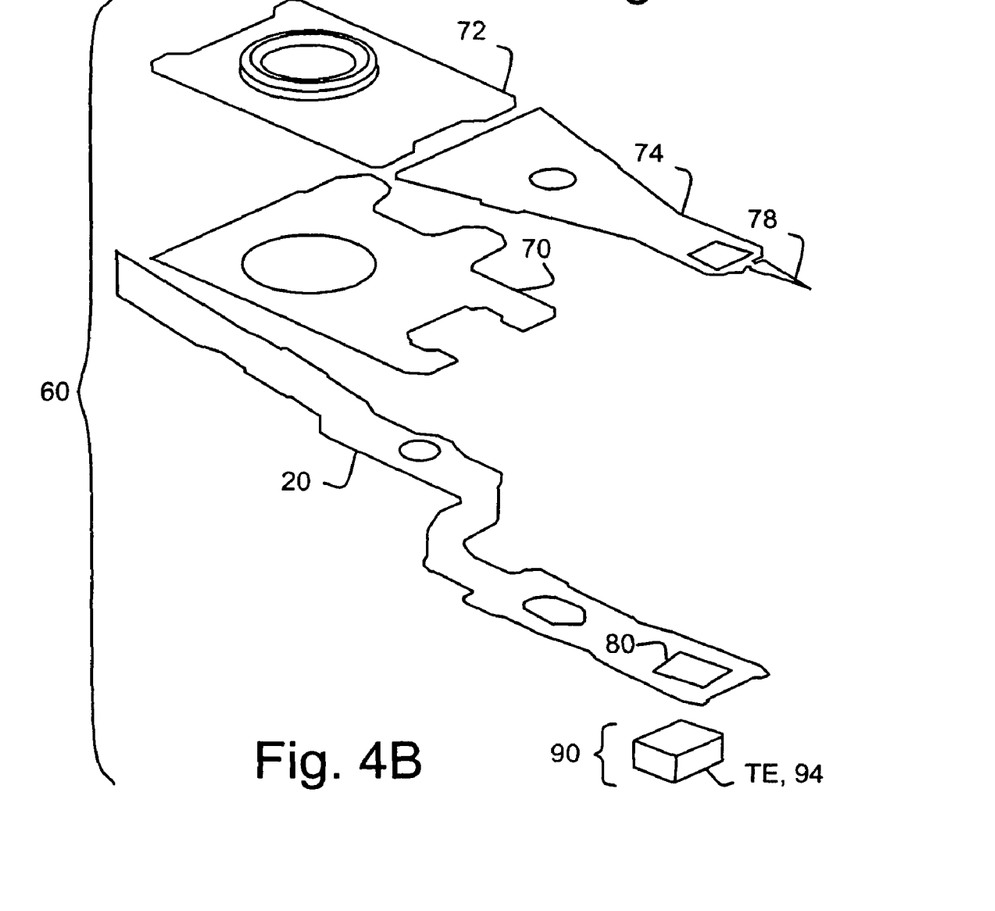
Figure 5B:
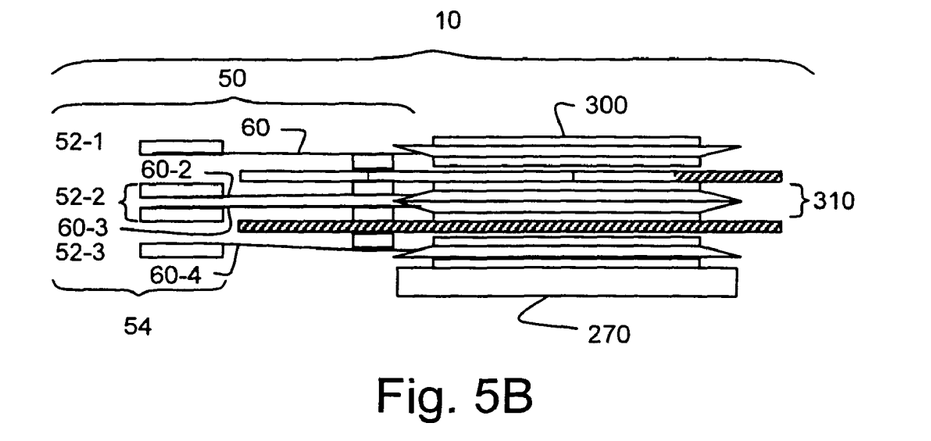

The head gimbal assembly 60, preferably includes a load tab 78 as shown in FIGS. 4B and 5B, coupling through a load beam 74 to engage the slider 90, where the load tab contacts a tab ramp 312 away from the slider, as shown in FIG. 6B. The tab ramps preferably serve as a cam through contacting the load tabs of head gimbal assemblies to engage their sliders into secure contact with their neighboring disk surfaces during non-operation periods.

Manufacturing the head gimbal assembly may include coupling the slider 90 to a flexure finger 20 to create the head gimbal assembly 60. The head gimbal assembly is a product of this process. The head gimbal assembly 60 may further be manufactured by any of several steps:

Coupling the pitch actuator PAA and the slider 90 to the flexure finger 20 included in a head suspension assembly to create the head gimbal assembly, where the head suspension assembly further includes the first coupling of the load beam 74, the flexure finger coupled at the flexure coupling point.

Another example manufacturing step for the head gimbal assembly includes coupling an actuator mounted head suspension assembly 64 as shown in FIG. 21B to the slider 90 to create the head gimbal assembly 60, where the actuator mounted head suspension assembly includes the pitch actuator PAA coupled to the flexure finger 20 included in the head suspension assembly 62.

Another example manufacturing step for the head gimbal assembly includes coupling the pitch actuator PAA and a loaded micro-actuator assembly to the head suspension assembly to create the head gimbal assembly 60, where the loaded micro-actuator assembly includes a micro-actuator assembly 80 coupled to the slider 90.

And another example manufacturing step for the head gimbal assembly includes coupling the loaded micro-actuator assembly to the actuator mounted head suspension assembly to create the head gimbal assembly 60.

Manufacturing the head gimbal assembly 60 may further include coupling the load beam 74 including the load tab 78 through a flexure finger 20 to the slider 90 to create the head gimbal assembly. Note that the flexure finger 20 may include one or more stiffening components made of at least one stainless steel layer, which are often made by gluing and/or welding a sheet of stainless steel to the flexure finger blank, and then cutting, stamping, and/or etching the result to create the flexure finger.

Figure 7:
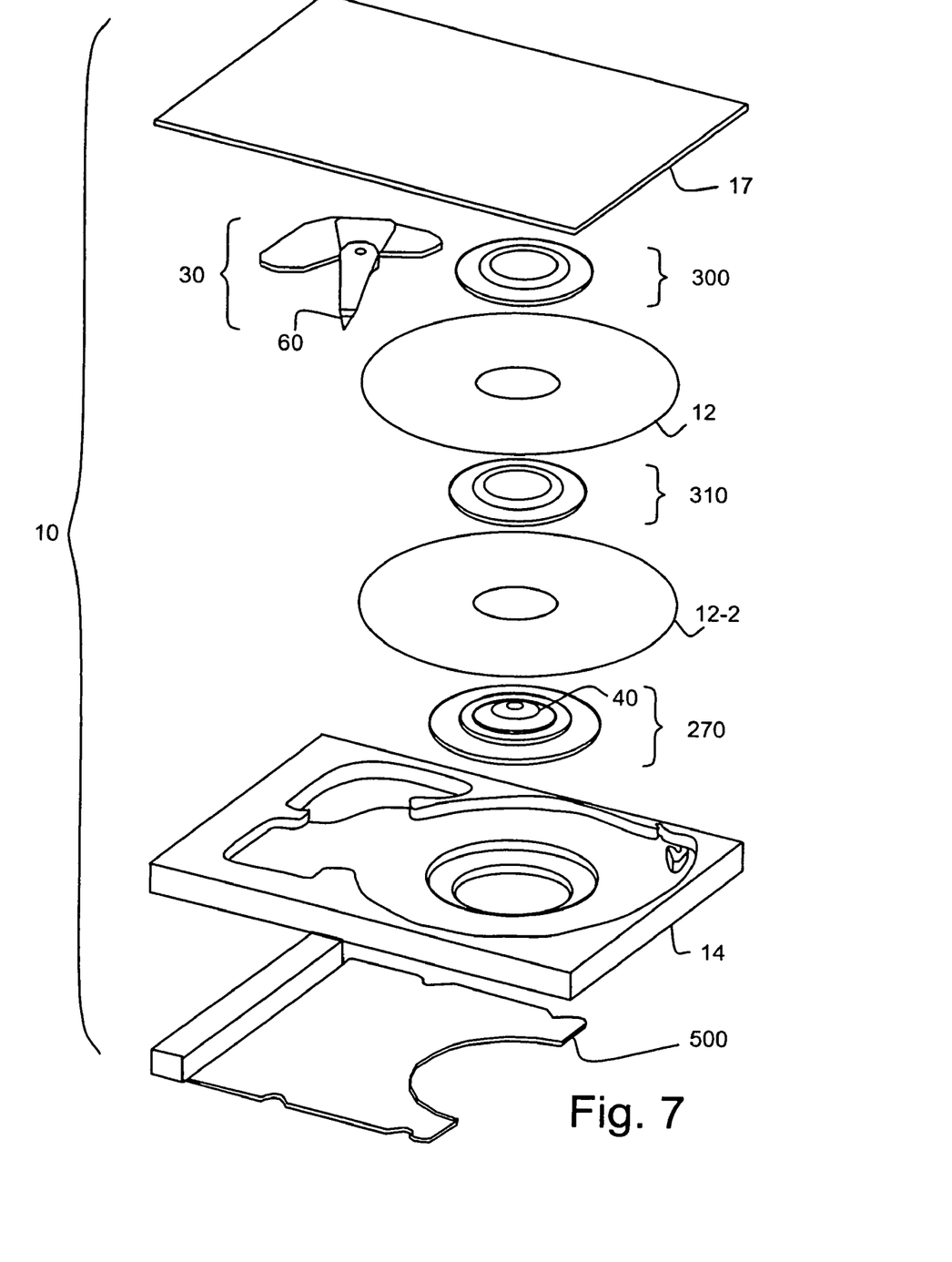
FIG. 7 shows an exploded view of a number of components the hard disk drive may include.

A head stack assembly 50 including at least one head gimbal assembly 60 may further support these operations as shown in FIGS. 5A, 5B and 7. Manufacturing the head stack assembly may include coupling at least one of the head gimbal assemblies to a head stack 54 to create the head stack assembly. The head stack assembly is a product of this process.

In greater detail, the head stack assembly 50 for the CSS hard disk drive 10 includes a head stack 54 coupling through an actuator arm 52 to at least one head gimbal assembly 60, and a main flex circuit electrically coupling to the flexure finger 20, where the main flex circuit may preferably include an embedded circuit coupling for providing the pitch actuation control signal to the pitch actuator PAA. The main flex circuit may further include a preamplifier providing the pitch actuation control signal to the pitch actuator, where the preamplifier receives a pitch control signal through the embedded circuit coupling to create the pitch actuation control signal.

The head stack 54 may couple to at least two of the head gimbal assemblies. By way of example, consider FIG. 5B showing the head stack 54 including the actuator arm 52, a second actuator arm 52-2 and a third actuator arm 52-3, coupling to the head gimbal assembly 60, a second head gimbal assembly 60-2, a third head gimbal assembly 60-3, and a fourth head gimbal assembly 60-4. The second actuator arm coupled to the second head gimbal assembly and a third head gimbal assembly 60-3, and the third actuator arm coupled to the fourth head gimbal assembly.

The hard disk drive 10 supporting these operations preferably includes the head stack assembly 50. In normal operation the head stack assembly pivots through an actuator pivot 58 to position at least one read-write head 94, embedded in a slider 90, over a rotating disk surface 120 as shown in FIG. 5A. The data stored on the rotating disk surface is typically arranged in concentric tracks. To access the data of a track 122, a servo controller first positions the read-write head by electrically stimulating the voice coil motor 30, which couples through the voice coil 32 and an actuator arm 52 to move a head gimbal assembly 60 in lateral positioning the slider close to the track. Once the read-write head is close to the track, the servo controller typically enters an operational mode known herein as track following. It is during track following mode that the read-write head is used to access the data stored on the track and the flying height must be most carefully controlled.

The sliders may be parked next to an inside diameter ID of their disk surface 120 in a Contact Start-Stop (CSS) hard disk drive, preferably with their air bearing surfaces including pads with diamond like Carbon, referred to herein as one or more pad PDLC as shown in FIGS. 2A, 2B and 9A to 9D. The typical height of the pad PDLC above the air bearing surface 92 is between 25 and 30 nanometers (nm) and a slider 90 may include more than five pads on the air bearing surface. The location and height of the pads are constrained by several performance and/or reliability requirements. The pads often need to be located so as to minimize interference with the disk surface 120-1 when the slider is flying above the rotating disk surface during normal access operations, for instance, by one or more of the pads contacting the rotating disk surface. While it is good to locate the pads near the trailing edge TE to minimizing tipping, the closer the pads are to the trailing edge, the greater the chance of pad contact with the rotating disk surface.

Figure 9A:
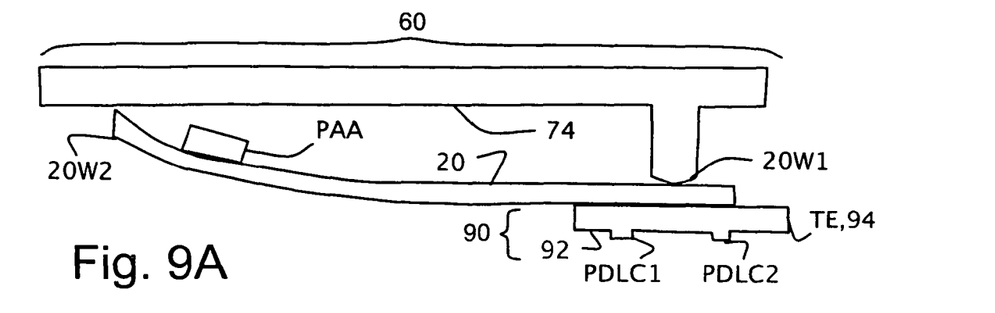
FIGS. 9A-9D show a pitch actuator PAA in a head gimbal assembly of a CSS hard disk drive.
Figure 9B:
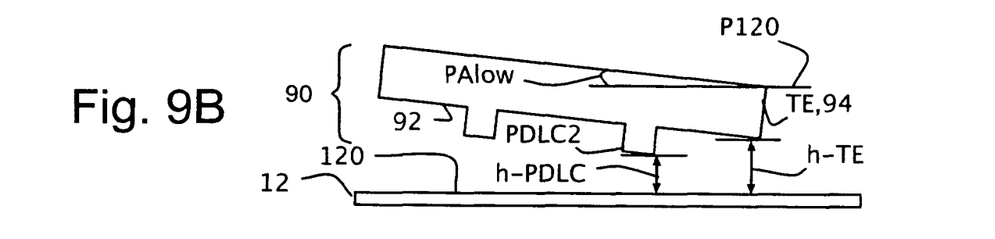
Figure 9C:
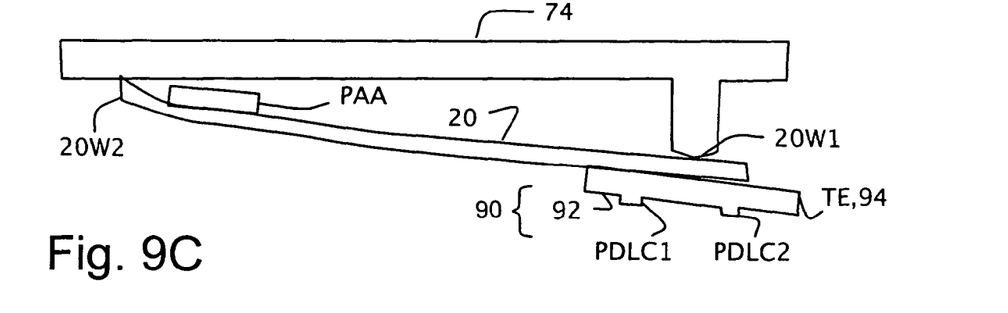
Figure 9D:
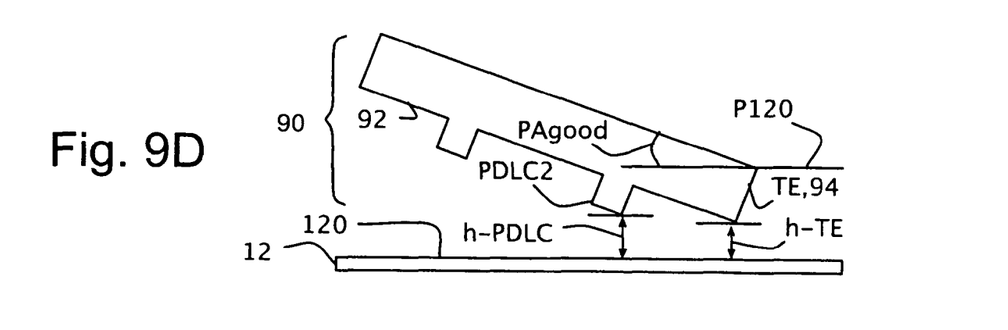

Consider the use of a pitch actuator PAA in a head gimbal assembly 60 of a CSS hard disk drive 10, as shown in FIGS. 9A to 9D. In normal ambient operating conditions, as shown in FIG. 9D, the pitch angle PA is a good pitch angle PAgood, which is enough to make minimum clearance location at read-write head 94 location, which is close to the trailing edge TE. However, as shown in FIG. 9B, when the pitch angle drops to a shallow pitch angle PAlow due to low pressure and/or high humidity conditions, this can result in undesirable "early" pad contact with the rotating disk surface 120-1. The reason why this pad contact is undesirable is that if there was no pitch angle drop, as shown in FIG. 9D, the minimum clearance location still would be at trailing edge and not at the pads, and there would be more margin between the flying height at trailing edge h-TE and the flying height at pad h-PDLC making it unlikely that there would be contact between the slider and the rotating disk surface, unless the altitude and/or the humidity conditions change for the worse.

The head gimbal assembly 60 in a CSS hard disk drive 10 may operate by asserting a pitch actuation control signal provided to at least one electrical coupling of a pitch actuator PAA. The pitch actuator responds to the pitch actuation control signal by flexing the flexure finger 20 toward the load beam 74 to increase the pitch angle PA of the slider 90 to a disk surface 120-1.

To increase the pitch angle, the flexure finger 20 is attracted to the load beam 74. FIG. 9A shows the pitch actuator PAA inactive, and gravity and other ambient conditions tending to lower the flexure finger. In certain conditions, such as the low pressure of high altitude and/or high humidity, the pitch angle is too low, which is designated as shallow pitch angle PAlow, as shown in FIG. 9B. In such situations, the pad PDLC tends to have too high a probability of contacting the rotating disk surface 120, which can result in damage to the read-write head 94 and/or the disk surface. FIG. 9C shows the pitch actuator activated attracting the flexure finger to the load beam, and consequently increasing the pitch angle to a good pitch angle PAgood, as shown in FIG. 9D.

The pitch actuator PAA may include an electrostatic coupling responding to the pitch actuation control signal to urge the flexure finger 20 toward the load beam 74 to flex the flexure finger. The electrostatic coupling includes a first plate coupled to the flexure finger interacting with a second plate coupled to the load beam to attract the flexure finger to the load beam. The load beam may include the second plate. The flexure finger may include the first plate.

The pitch actuator PAA may include a piezoelectric stack coupling to the flexure finger 20 to urge the flexure finger toward the load beam 74 to flex the flexure finger, when the piezoelectric stack is stimulated by the pitch actuation control signal.

The disk clamp 300 may preferably support parking the sliders on disk surfaces by including a third tab ramp. The spindle motor 270 may preferably support parking the sliders on disk surfaces by including a fourth tab ramp. The disk spacer 310 preferably supports parking the sliders on disk surfaces by including a third tab ramp radially mounted to a fourth tab ramp, which form a radially symmetric triangular extension from the disk spacer about the spindle shaft center 42.

The CSS hard disk drive 10 may further include a second disk surface 120-2 for access by a second head gimbal assembly 60-2 including a third load tab 78-3 for contact with a third tab ramp near the far inside diameter ID of the second disk surface. The CSS hard disk drive may further include a disk clamp 300 containing the first tab ramp and a spindle motor 270 containing the second tab ramp.

The CSS hard disk drive 10 may further include a disk spacer 310 including a third tab ramp 312-3 facing the second disk surface 120-2 and coupling to a fourth tab ramp 312-4 facing a third disk surface 120-3 included in a second disk 12-2, a third head gimbal assembly 60-3 including a third load tab 78-3 for contacting the third tab ramp to engage a third slider 60-3 into the secure contact of the second disk surface, and a fourth head gimbal assembly 60-4 including a fourth load tab 78-4 facing the third disk surface.

Alternatively, the slider 90 may be parked on a ramp near the outside diameter OD of the disk surface, in which case, the air bearing surfaces often will not include pads with diamond like Carbon, as shown in FIG. 4A.

Manufacturing the hard disk drive 10 may include rotatably coupling the head stack assembly 50 by an actuator pivot 58 to a disk base 14 to create the hard disk drive, which is shown in FIG. 5A. The hard disk drive is a product of this process.

The first disk 12-1 may be rotatably coupled between the disk clamp 300 and the spindle motor 270 about the spindle shaft center 42, placing the first tab ramp close to the first disk surface and the second tab ramp close to the second disk surface and installing the head stack assembly 50 including the first head gimbal assembly 60-1 near the first disk surface and further including the second head gimbal assembly 60-2 near the second disk surface to further create the hard disk drive.

The CSS hard disk drive 10 may further include more than two disks and more than one disk spacer. By way of example, the an embodiment of the invention's CSS hard disk drive may include three disks separated by two disk spacers.

What is claimed is:

1. A method, comprising the step:
    a slider operating an intake heater situated near a front edge to heat air and operating an air bearing surface within a flying height of a rotating disk surface in a hard disk drive, with said air bearing surface including a front bulwark near said front edge and a central island near a trailing edge and near a read-write head;
    wherein the step of said slider operating said air bearing surface comprises the steps:
    said intake heater altering a saturation water vapor pressure between said air bearing surface and said rotating disk surface in response to said air being heated;
    said air bearing surface removing a front saturation water vapor pressure peak near said front bulwark of said air bearing surface; and
    said air bearing surface removing a bad flow pattern area between said front bulwark and said central island near said trailing edge of said slider.

2. The method of claim 1, wherein the step operating said slider, further comprises:
    operating said slider with a compression ratio between a front height and said flying height;
        wherein said front height is a distance between said front edge and said rotating disk surface;
        wherein said flying height is said distance between said trailing edge and said rotating disk surface;
        wherein said compression ratio is the ratio of air pressure before said front edge to said air pressure at said trailing edge; and
        wherein said compression ratio is at least eight.

3. The method of claim 2, wherein said compression ratio is at least ten.

4. The slider of claim 1, comprising:
    said air bearing surface including said front bulwark near said front edge and said central island near said trailing edge and near said read-write head;
    said intake heater situated near said front edge to heat air and alter a saturation water pressure between said air bearing surface and said rotating disk surface; and
    said read-write head, with said air bearing surface providing said central island near said read-write head.

5. The slider of claim 4, wherein said air bearing surface, comprises:
    first means for removing said front saturation water vapor pressure peak (MFBS) near said front bulwark (FB); and
    second means for removing said bad flow pattern area (MRLP) between said front bulwark and said central island (CI).

6. The slider of claim 5, wherein said first means for removing, comprises:
    a front bulwark channel dividing said front bulwark into a first front bulwark and a second front bulwark.

7. The slider of claim 6, wherein said front bulwark channel may be of steady depth between said first front bulwark and said second front bulwark.

8. The slider of claim 5, wherein said second means for removing, comprises: a central fin between said front bulwark and said central island.

9. The slider of claim 8, wherein said central fin connects to said central island.

10. A method of manufacturing said slider of claim 4, comprising the step:
    forming said air bearing surface with said central island near said trailing edge to create said slider.

11. The slider as a product of the process of claim 10.

12. A head gimbal assembly, comprising: said slider of claim 4.

13. The head gimbal assembly of claim 12, further comprising: a pitch actuator mechanically coupled through a flexure finger to said slider for altering a pitch angle between said slider and said rotating disk surface.

14. A method of manufacturing said head gimbal assembly of claim 12, comprising the step:
    coupling said slider to a flexure finger to create said head gimbal assembly.

15. The head gimbal assembly as a product of the process of claim 14.

16. A head stack assembly comprising at least one of said head gimbal assemblies of claim 12.

17. A method of manufacturing said head stack assembly of claim 16, comprising the step:
    coupling at least one of said head gimbal assemblies to a head stack to create said head stack assembly.

18. The head stack assembly as a product of the process of claim 17.

19. The hard disk drive comprising said head stack assembly of claim 16.

20. The hard disk drive of claim 19, wherein said slider is parked next to an inside diameter on said disk surface.

21. The hard disk drive of claim 19, wherein said slider is parked on a ramp near an outside diameter of said disk surface.

22. A method of manufacturing said hard disk drive of claim 19, comprising the step:
    rotatably coupling said head stack assembly by an actuator pivot to a disk base to create said hard disk drive.

23. The hard disk drive as a product of the process of claim 22.

24. A slider for use in a hard disk drive, comprising:
    an intake heater situated near a front edge to heat air and alter a saturation water pressure between an air bearing surface and a rotating disk surface;
    said air bearing surface providing a central island near a read-write head, further comprising:
    a front bulwark channel dividing a front bulwark into a first front bulwark and a second front bulwark to remove a front saturation vapor pressure peak near said front bulwark, when said air bearing surface is within a flying height of a said rotating disk surface; and
    a central fin between said front bulwark and said central island to remove a bad flow pattern area between said front bulwark and a said central island near a trailing edge of said slider, when said air bearing surface is within said flying height of said rotating disk surface;
    wherein said flying height is at most twenty nanometers;
    wherein said front bulwark is located near a said front edge of said slider; and
    wherein said central island is located near said read-write head.

25. The slider of claim 24, wherein said front bulwark channel may be of steady depth between said first front bulwark and said second front bulwark.

26. The slider of claim 24, wherein said central fin connects to said central island.

27. A method of manufacturing said slider of claim 24, comprising the step:
    forming said air bearing surface with said central island near said trailing edge to create said slider.

28. The slider as a product of the process of claim 27.

29. A head gimbal assembly, comprising: said slider of claim 24.

30. The head gimbal assembly of claim 29, further comprising: a pitch actuator mechanically coupled through a flexure finger to said slider for altering a pitch angle between said slider and said rotating disk surface.

31. A method of manufacturing said head gimbal assembly of claim 29, comprising the step:
    coupling said slider to a flexure finger to create said head gimbal assembly.

32. The head gimbal assembly as a product of the process of claim 31.

33. A head stack assembly comprising at least one of said head gimbal assemblies of claim 29.

34. A method of manufacturing said head stack assembly of claim 33, comprising the step:
    coupling at least one of said head gimbal assemblies to a head stack to create said head stack assembly.

35. The head stack assembly as a product of the process of claim 34.

36. The hard disk drive comprising said head stack assembly of claim 33.

37. The hard disk drive of claim 36, wherein said slider is parked next to an inside diameter on said disk surface.

38. The hard disk drive of claim 36, wherein said slider is parked on a ramp near an outside diameter of said disk surface.

39. A method of manufacturing said hard disk drive of claim 36, comprising the step:
    rotatably coupling said head stack assembly by an actuator pivot to a disk base to create said hard disk drive.

40. The hard disk drive as a product of the process of claim 39.

41. The slider of claim 24, wherein said flying height is at most ten nanometers.

\* \* \* \* \*